(12) United States Patent
Stall et al.

(10) Patent No.: US 8,843,900 B2
(45) Date of Patent: Sep. 23, 2014

(54) SERIAL DEBUGGING EXPERIENCE FOR PARALLEL PROGRAMS

(75) Inventors: Michael Stall, Bothell, WA (US); Marko Radmilac, Bellevue, WA (US); Krishan Varadarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 13/494,338

(22) Filed: Jun. 12, 2012

(65) Prior Publication Data

US 2013/0332908 A1 Dec. 12, 2013

(51) Int. Cl.
*G06F 11/36* (2006.01)

(52) U.S. Cl.
CPC ..................... *G06F 11/36* (2013.01)
USPC .......................................................... 717/129

(58) Field of Classification Search
USPC .................................................. 717/100–178
See application file for complete search history.

(56) References Cited

U.S. PATENT DOCUMENTS

2006/0048098 A1* 3/2006 Gatlin et al. ................... 717/124
2006/0101405 A1* 5/2006 Buschardt et al. ............. 717/124
2008/0115113 A1* 5/2008 Codrescu et al. ............. 717/127
2011/0302651 A1* 12/2011 Bates et al. ..................... 726/22
2012/0110554 A1* 5/2012 Bates et al. .................... 717/129
2012/0159451 A1* 6/2012 Bates ............................. 717/125

OTHER PUBLICATIONS

Bugerya, Interactive Debugging of Parallel Programs, 2007.*
Cheng and Hood, A portable Debugger for Parallel and Distributed Programs, 1994.*
LeBlanc and Mellor-Crummey, Debugging Parallel Programs with Instant Replay, 1987.*

* cited by examiner

*Primary Examiner* — Wei Zhen
*Assistant Examiner* — Zhan Chen
(74) *Attorney, Agent, or Firm* — Ben Tabor; David Andrews; Micky Minhas

(57) ABSTRACT

Systems, methods, and computer program products for facilitating a serial debugging experience for programs running in a distributed, non-deterministic, out-of-order (i.e., parallel) fashion are disclosed. Such systems, methods, and computer program products provide a modified combination of breakpoints, stepping, and call stacks that facilitate the ability to improve the debugging experience for out-of-order program execution. In an embodiment, a task scheduler provides a distributed task graph. Then, the user may hit breakpoints sequentially within the graph's execution and use deterministic stepping (i.e., step-in, step-out, and step-over functions) to create a logical call stack from a distributed task graph. Such embodiments allow the program to execute in a distributed and parallel manner, while presenting the user a sequential execution experience in the debugger.

20 Claims, 3 Drawing Sheets

SERIAL DEBUGGING EXPERIENCE FOR PARALLEL PROGRAMS

FIELD OF THE INVENTION

The present disclosure generally relates to the debugging of computer programs, and more particularly to the debugging of computer programs that execute in a non-serial fashion.

BACKGROUND

With today's rapid technological development, programs—sequences of coded software instructions that are written to perform specified tasks on a particular computing device (e.g., desktop, laptop, notebook, tablet computer, personal digital assistant (PDA), mobile telephone, smart telephone, and the like) within a targeted operating system—have significantly grown in complexity and include programs that execute in a distributed and out-of-sequence manner. For example, telecommunication networks, network applications, real-time process controls, and parallel computation (i.e., scientific computing) are all fields in which distributed programming is necessary. These non-deterministic programs (i.e., programs that do not always execute in the same manner, but whose program flow is chosen during run time at certain "choice points" specified by the programmer) are essential for, but not limited to, processes that compute exponentially large numbers.

Assisting in program composition, debuggers find and either correct or notify the programmer of flaws in the executing (object) code resulting from their compiled source code. That is, a debugger (or debugging tool) is a computer program that is used to test and debug other programs (i.e., the "target" program). An example includes the Microsoft Visual Studio Debugger available from Microsoft Corporation of Redmond, Wash. Debuggers assist programmers in analyzing newly-written source code by typically providing functions such as running a program step-by-step (i.e., single-stepping or program animation), stopping (or pausing) the program to examine the current state at some event or specified instruction by means of a "breakpoint," and tracking the values of variables.

The debugging process is relatively simple for programs that execute in a serial fashion (i.e., processing data operations individually and in turn). This is not the case, however, for program code that executes in an out-of-sequence (i.e., parallel) manner. For such parallel programs, debuggers attach simultaneously to individual processes. This often results in inaccuracies. For example, libraries often allow program loops to execute out of order. Yet, conventional debugging programs will collect these libraries during compilation, and hit the set breakpoints in random order (and thus, not provide the programmer-user with a deterministic debugging experience).

SUMMARY

This summary is provided to introduce a selection of concepts. These concepts are further described below in the Detailed Description section. This summary is not intended to identify key features or essential features of the claimed subject matter, nor is this summary intended as an aid in determining the scope of the claimed subject matter.

Embodiments of the present disclosure meet the above-identified needs by providing systems, methods and computer program products that facilitate a serial debugging experience for programs that do not execute in a serial fashion (i.e., distributed, non-deterministic, or out-of-order executed programs).

Embodiments of the present disclosure include technologies that produce a serial debugging experience that, in the presence of breakpoints, allows the program to execute in a distributed and parallel fashion. In various embodiments, a program executing code out-of-sequence may have the ability to hit breakpoints sequentially. Then, deterministic stepping may be added, giving users the ability to create a logical call stack (i.e., a stack data structure that stores information about the active subroutines of the computer program from all machines executing the distributed program) from a distributed task graph and an option to be warned when such stepping is not possible.

Embodiments of the present disclosure include technologies that provide a deterministic serial debugging experience (i.e., breakpoints and stepping) for a computer program that is actually executing in a distributed, non-deterministic, and/or out-of-order fashion. In such embodiments, the ideal user experience is a deterministic view. This is contrary to current debuggers that present a non-deterministic view to users. For example, if a program has a single logical thread that is executing on 1000 physical threads, traditional debuggers force the user to be aware of all 1000 threads, and try to offer additional concepts (e.g., "thread groups") to make it manageable for the user during the debugging process. In contrast, such embodiments of the present disclosure provide the user with a fundamentally simpler model—one that focuses on the single logical thread.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

Figure 1:
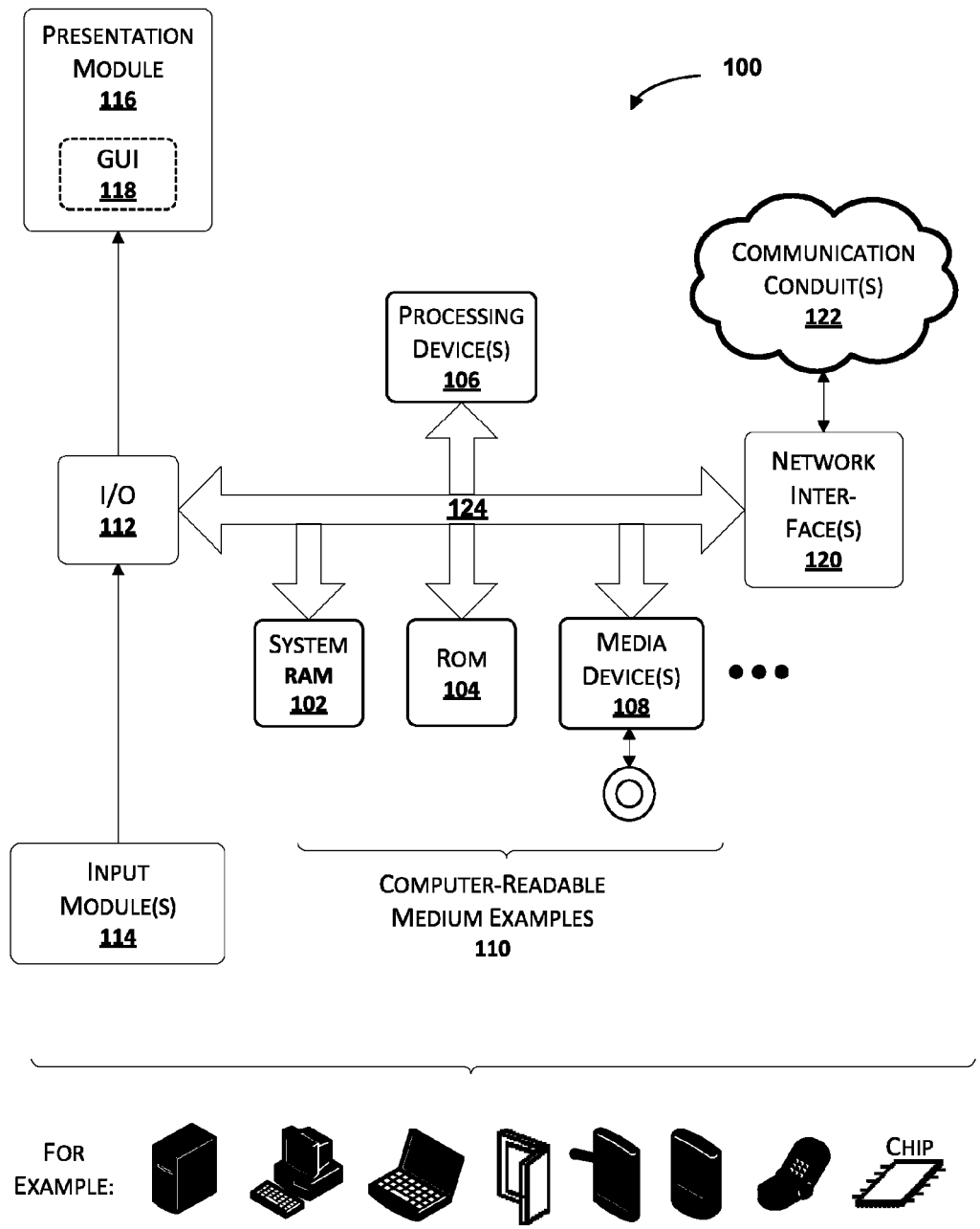
FIG. 1 is a block diagram of an exemplary computer system useful for implementing an embodiment of the present disclosure.

Embodiments of the present disclosure are directed to systems, methods, and computer program products for facilitating a serial debugging experience for programs that execute in a non-serial fashion (i.e., programs executing in a distributed, non-deterministic, and/or out-of-order fashion) with breakpoints and stepping.

In one embodiment, the present disclosure provides a serial debugging paradigm (i.e., experience) based on distributed execution. In such an embodiment, a compiler, for example, may divide a program into multiple "tasks" (e.g., one task for the overall program, one for each for-loop body, and one for the function bodies) and interface with a distributed scheduler to execute those tasks in parallel. Based on logical expectation, iterations may execute in sequential order (e.g., iteration three executes before iteration seven). Because the scheduler is distributed, however, the iterations may be executed conversely (e.g., iteration seven executes before iteration three). In such an embodiment, the scheduler coordinates the execution tasks. Such a task scheduler cooperates with "sub-debuggers" (i.e., a basic debugging infrastructure attached to each node) to stitch the iteration sequence views together to form a single logical view to be presented to the user.

In another embodiment, the present disclosure provides a serial debugging experience based on a scheduler tracking additional information to assemble a logical call stack from a distributed task graph. For example, based on a single logical call stack, such a scheduler may need to track parent tasks (i.e., forming a chain that can be walked to show a logical call stack) and map a task to a source function.

In yet another embodiment, the present disclosure provides a serial debugging experience based on hitting breakpoints sequentially (even with out-of-order execution). In such an embodiment, when a breakpoint is hit (i.e., reached), all present tasks may be blocked until all previous tasks are performed. Such previous tasks that hit a breakpoint may be queued so that breakpoints may then get dispatched in sequential order (possibly avoiding static analysis of breakpoint order). For example, each function body gives an ordered task identification to each task that is created (i.e., creating a tree of task identifications that roughly match the call-tree). When a breakpoint is reached, however, each frame call stack is "walked up" and the function may be instructed to run all previous task identifications.

In another embodiment, the present disclosure provides a serial debugging experience based on stepping (i.e., step-in, step-out, and step-over). In such an embodiment, stepping may be built on distributed breakpoint and call stack techniques from various other embodiments. In such an embodiment, task boundaries may be known and so the compiler may provide this information to an integrated debugging environment (IDE) in order to show task boundaries in the source code. Such embodiment may show glyphs in a debugger application's interface (e.g., a Graphical User Interface (GUI), a command line interface, or the like) to indicate where task boundaries are in the source code, and may warn the user that stepping over that boundary may not work. For example, step-over and step-out within a task normally works (i.e., it may be implemented using existing techniques used for serial debugging). Step-in functions within a task also normally work. The task, however, may alert the user of the step-complete during step-in functions through a call that posts a task.

In one embodiment, the present disclosure is directed toward one or more computer systems or computing devices capable of carrying out the functionality of the embodiments described herein.

FIG. 1 sets forth illustrative computing functionality 100 that can be used to implement any aspect of the functions described herein. For example, computing functionality 100 can be used to implement any aspect of virtual call stack environment 200 of FIG. 2, debugging process 300 illustrated in FIG. 3, and/or any parts/steps thereof. In all cases, computing functionality 100 represents one or more physical and tangible processing mechanisms.

Computing functionality 100 may include volatile and non-volatile memory, such as RAM 102 and ROM 104, as well as one or more processing devices 106 (e.g., one or more CPUs, and/or one or more GPUs, etc.). The computing functionality 100 also optionally includes various media devices 108, such as a hard disk module, an optical disk module, and so forth. The computing functionality 100 can perform various operations identified above when the processing device(s) 106 executes instructions that are maintained by memory (e.g., RAM 102, ROM 104 or elsewhere).

More generally, instructions and other information may be stored on any computer readable medium 110, including, but not limited to, static memory storage devices, magnetic storage devices, optical storage devices, and so on. The term "computer readable medium" also encompasses plural storage devices. In all cases, computer readable medium 110 represents some form of physical and tangible entity. By way of example, and not limitation, computer readable medium 110 may comprise "computer storage media" and "communications media."

"Computer storage media" include volatile and non-volatile, removable and non-removable media implemented in any method or technology for storage of information, such as computer readable instructions, data structures, program modules or other data. Computer storage media include, but are not limited to, RAM 102, ROM 104, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Computing functionality 100 also includes an input/output module 112 for receiving various inputs (via input modules 114), and for providing various outputs (via one or more output modules). One particular output mechanism may include a presentation module 116 and an associated GUI 118. Computing functionality 100 may also include one or more network interfaces 120 for exchanging data with other devices via one or more communication conduits 122. One or more communication buses 124 communicatively couple the above-described components together.

Communication conduit(s) 122 may be implemented in any manner (e.g., by a local area network, a wide area network (e.g., the Internet), etc., or any combination thereof). Communication conduit(s) 122 can include any combination of hardwired links, wireless links, routers, gateway functionality, name servers, etc., governed by any protocol or combination of protocols.

Alternatively, or in addition, any of the functions described herein can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code can be stored in one or more computer readable memory devices, as described with reference to FIG. 1. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, or any other computing device).

Figure 2:
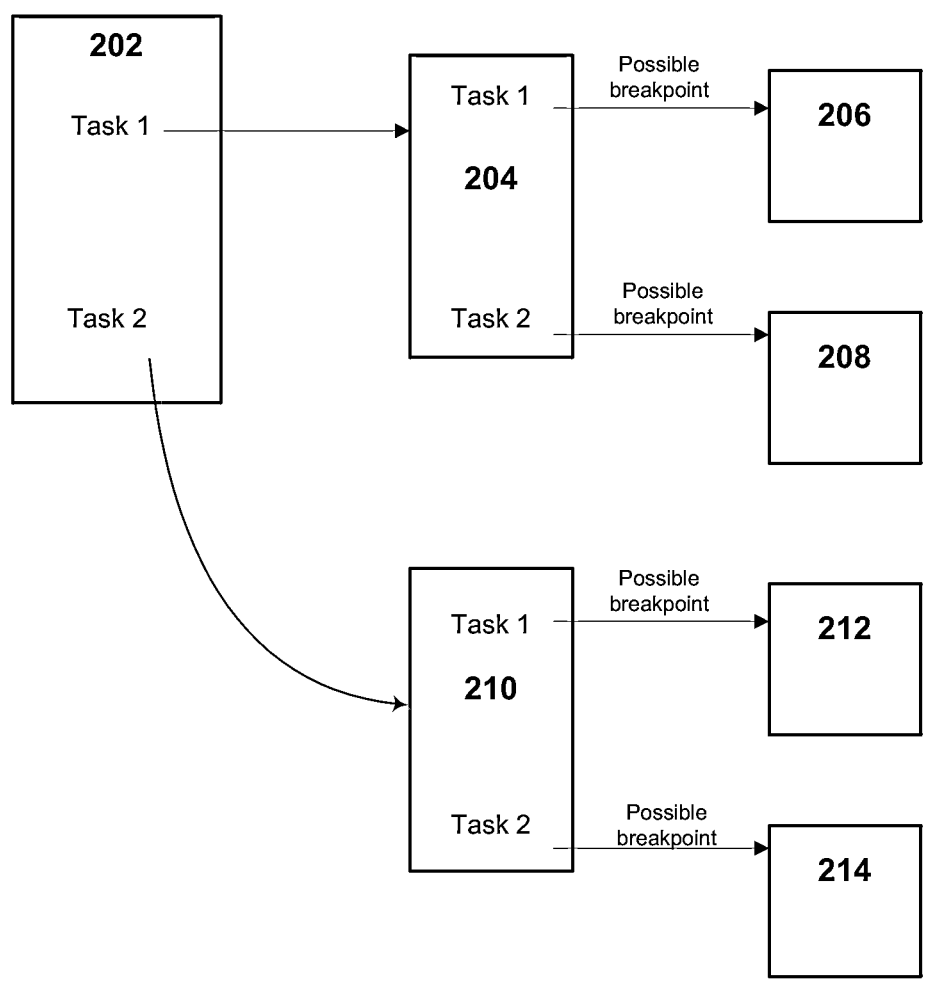
FIG. 2 is a block diagram of a virtual call stack environment according to an embodiment of the present disclosure.

Referring to FIG. 2, a block diagram illustrating an implementation of a virtual call stack environment 200, according to an embodiment of the present disclosure, is shown. As will be appreciated by those skilled in the relevant art(s) after reading the description herein, a "virtual call stack" refers to a call stack data structure that stores information about the active subroutines of a computer program to keep track of the point to which each active subroutine should return control when it finishes executing. For example, function foo( ) may call function bar( ), then the virtual call stack is represented as: foo→bar. "Virtual" refers to the fact that "foo→bar" is the programmer/user's point of view of the programs execution. This is in contrast to a "physical" call stack which represents the actual threads/machines on which functions foo( ) and bar( ) may be actually executing. For example, in a parallel execution case, The physical call stack may be:

Thread 1: task infrastructure 1→foo→task infrastructure 2

Thread 2: task infrastructure 3→bar

Thus, the virtual call stack represents the physical call stack, but filtering out the scheduling infrastructure that is not part of the user's view of the program, and weaving them together to show the program's logical control flow.

As will also be appreciated by those skilled in the relevant art(s) after reading the description herein, environment 200 would exist on computing functionality 100 where a graph node (function) 202 is executing on the call tree.

According to an embodiment of the present disclosure, a user utilizing a computer program debugger according to the present disclosure may set breakpoints and, once such breakpoints are hit, may decide which tree of tasks to present (based on whether previous tasks have been done). These tasks may be presented in order which would allow for stepping at each breakpoint.

To illustrate the above point, assume the task scheduler executes on virtual call stack 200 utilizing a breakpoint at a task within function 214, creating the call stack functions 202→210→214 as task 2. Other nodes may be running (functions 204, 206, 208, and/or 212) as breakpoint 214 is reached. Thus, function 214 is blocked as the task scheduler "walks up" the call stack of function 214. Such scheduler may now execute all previous tasks dispatched from that frame for each parent frame, next visiting function 210. Task 2 in the frame of function 210 (i.e., a breakpoint) may have been hit, thus all tasks before task 2 may be executed by function 210 (e.g., function 212). According to such an embodiment of the present disclosure, the scheduler then visits the next frame up (i.e., function 202) and all tasks before task 2 may then be executed (i.e., executing function 204 and its children→functions 206 and 208).

Continuing with the same illustration, in an embodiment of the present disclosure, there may also be a breakpoint in function 208. The user may see function 208 before the breakpoint in function 214 (i.e., function 208 occurs sequentially before function 214). While executing the tasks for function 214, the scheduler may execute function 208 and hit a breakpoint which may then walk up the call stack (i.e., functions 202→204→208). Therefore, function 202 may then get the breakpoint events for function 208 and function 214 and sort them.

Figure 3:
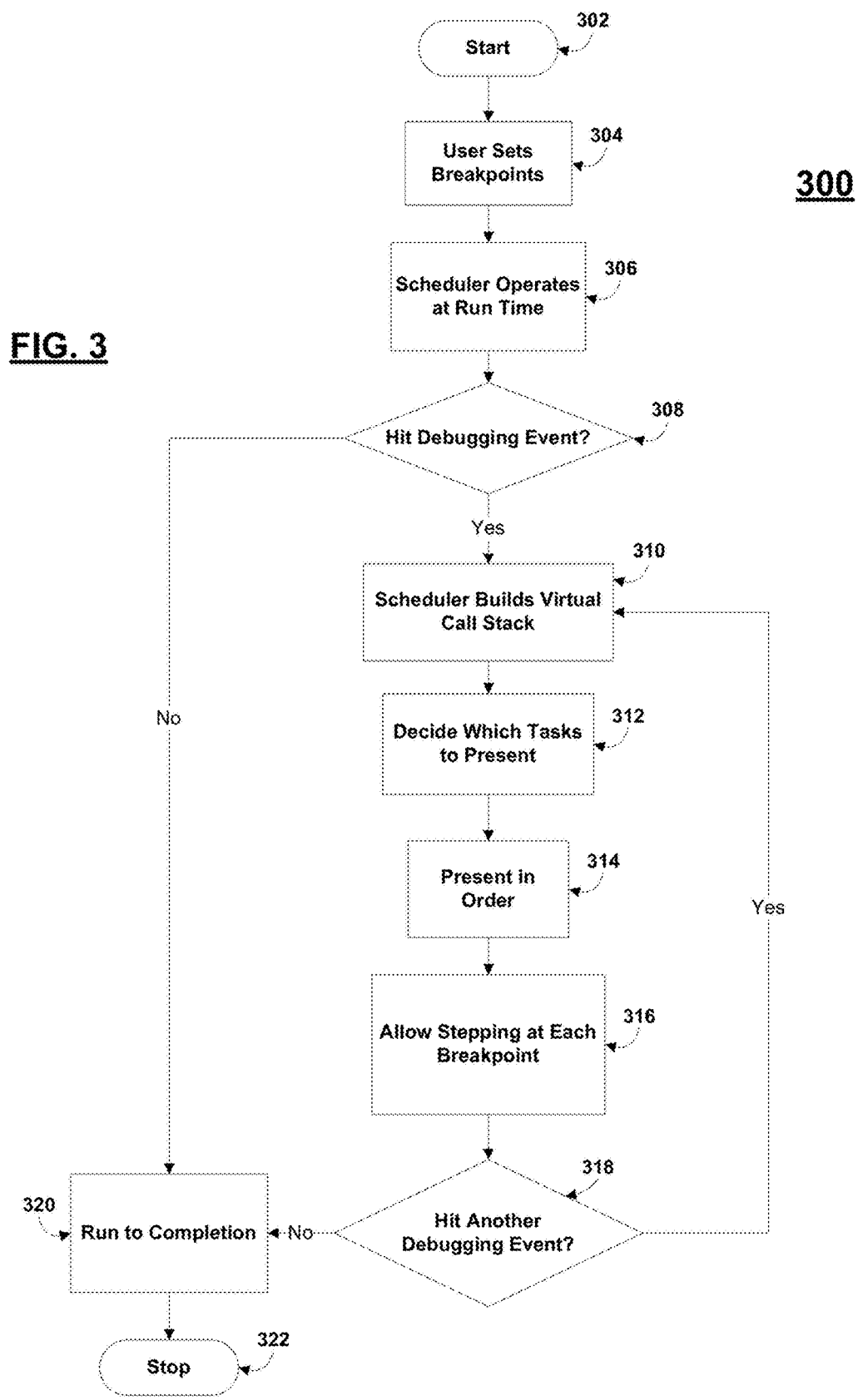
FIG. 3 is a flowchart illustrating a parallel debugging process according to an embodiment of the present disclosure.

Referring to FIG. 3, a flowchart illustrating debugging process 300, according to an embodiment of the present disclosure, is shown. Process 300, which would execute on computing functionality 100 within a debugging application that presents a user interface, such as a GUI, command line interface, or the like, to a user which includes a representation of the source code file of a program for the purpose of debugging, begins at step 302 with control passing immediately to step 304.

In step 304, a user executing within environment 200, sets breakpoints on various locations within the source file of the program to be debugged. In step 306, the task scheduler operates on the source file of the program to be debugged once it is being executed. In step 308, process 300 determines if any debugging events are hit. As will be apparent to one skilled in the relevant art(s) after reading the description herein, such debugging events may be a user-set breakpoint or stepping function. If the task scheduler does not hit any debugging event, process 300 proceeds to step 320, where the program runs to completion.

If the task scheduler hits a debugging event, however, process 300 proceeds to step 310. In step 310, the task scheduler builds a virtual call stack 200 based on available functions (e.g., functions 202-214) and debugging events. In step 312, the task scheduler determines which tasks to present to the user based on whether previous tasks have been performed on each function. In step 314, selected tasks are then executed in the order of selection. Then, in step 316, stepping (i.e., step-in, step-out, and/or step-over) is performed, allowing for the execution of the selected tasks' code one line at a time. In step 318, if the task scheduler hits another debugging event, control passes back to step 310 where the scheduler builds a virtual call stack based on the then-current debugging event hit. If the task scheduler, however, does not hit another debugging event, the scheduler runs to completion in step 320.

Process 300, which facilitates the execution of breakpoint determination, stepping, and call stack creation for parallel debugging with serial semantics, then terminates as indicated by step 322.

As will be apparent to one skilled in the relevant art(s) after reading the description herein, code implementing environment 200 and process 300, that facilitate the serial debugging of programs executing in a non-serial fashion (i.e., distributed, non-deterministic, parallel, or out-of-order executed programs) may be part of a "standard" debugger application that ships from a developer to be used on a particular computing functionality 100 for a specific application program language (and operating system), or may be later added as part of a update (or patch).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents. In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within operating systems and computing devices other than those mentioned herein for illustration purposes).

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A computer-implemented method for providing a user with a serial debugging experience for a program that executes in a non-serial fashion on a plurality of computing devices, comprising:
    presenting an interface to the user, wherein said interface comprises a representation of a source code for the program and wherein the program comprises a plurality of functions that are configured to be executed in a non-deterministic and parallel manner across a plurality of computing devices;
    receiving, from the user and via said interface, selection of at least one breakpoint within one of said plurality of functions;
    building a virtual call stack utilizing said breakpoint and said plurality of functions, said virtual stack representing a physical call stack while filtering out scheduling infrastructure to present a logical control flow of the program;
    executing, utilizing said virtual call stack, an object code of the program until the breakpoint is reached, said object code being derived from the source code;
    based on reaching said breakpoint, blocking the one of said plurality of functions; and
    based on reaching said breakpoint, and while blocking the one of said plurality of functions, executing at least one other of the plurality of functions that appears prior to the one of said plurality of functions in the logical control flow of the program.

2. The computer-implemented method of claim 1, wherein said interface provides a debugging environment for the program.

3. The computer-implemented method of claim 1, wherein building the virtual call stack is performed by a task scheduler executing on at least one of the computing devices.

4. The computer-implemented method of claim 1, further comprising, subsequent to executing the at least one other of the plurality of functions that appears prior to the one of said plurality of functions in the logical control flow of the program, indicating at the interface that the breakpoint was reached.

5. The computer-implemented method of claim 1, wherein executing the object code of the program occurs on at least two of the computing devices.

6. The computer-implemented method of claim 1, wherein the program is a distributed program executing in multiple threads across the computing devices.

7. The computer-implemented method of claim 1, further comprising:
    compiling the source code of the program into the object code, which object code is capable of executing on the one or more computing devices.

8. The computer-implemented method of claim 1, wherein executing the at least one other of the plurality of functions that appears prior to the one of said plurality of functions in the logical control flow of the program comprises at least one of: stepping-in; stepping-out; or stepping-over.

9. A system for providing a user with a serial debugging experience for a program that executes in a non-serial fashion on one or more computing devices, the system comprising:
    one or more processors; and
    one or more hardware storage devices having stored thereon computer executable instructions that, when executed by the one or more processors, cause the system to perform at least the following:
        presenting an interface capable of presenting to the user a representation of a source code for the program, wherein the program comprises a plurality of functions that are configured to be executed in a non-deterministic and parallel manner across a plurality of computing devices;
        receiving, from the user and via said interface, selection of at least one breakpoint within one of said plurality of functions;
        building a virtual call stack utilizing said breakpoint and said plurality of functions, said virtual stack representing a physical call stack while filtering out scheduling infrastructure to present a logical control flow of the program;
        executing, utilizing said virtual call stack, an object code of the program until the breakpoint is reached, the object code being derived from the source code;
        based on reaching said breakpoint, blocking the one of said plurality of functions; and
        based on reaching said breakpoint, and while blocking the one of said plurality of functions, executing at least one other of the plurality of functions that appears prior to the one of said plurality of functions in the logical control flow of the program.

10. The system of claim 9, wherein building the virtual call stack comprises a task scheduler executing on at least one of the computing devices.

11. The system of claim 9, further comprising, subsequent to executing the at least one other of the plurality of functions that appears prior to the one of said plurality of functions in the logical control flow of the program, indicating at the interface that the breakpoint was reached.

12. The system of claim 10, wherein said program is a distributed program executing in multiple threads across a plurality of the computing devices.

13. One or more hardware storage devices having stored thereon computer-executable instructions that, when executed by one or more processors, cause the one or more processors to perform a method for providing a user with a serial debugging experience for a program that executes in a non-serial fashion, comprising:
    presenting an interface to a user, wherein said interface comprises a representation of a source code for a program and wherein said program comprises a plurality of functions that are configured to be executed in a non-deterministic and parallel manner across a plurality of computing devices;
    receiving, from said user and via said interface, selection of at least one breakpoint within one of said plurality of functions;
    building a virtual call stack utilizing breakpoint and said plurality of functions, said virtual stack representing a physical call stack while filtering out scheduling infrastructure to present a logical control flow of the program;
    executing, utilizing said virtual call stack, an object code of the program until the breakpoint is reached, the object code being derived from the source code;

based on reaching said breakpoint, blocking the one of said plurality of functions; and based on reaching said breakpoint and while blocking the one of said plurality of functions, executing at least one other of the plurality of functions that appears prior to the one of said plurality of functions in the logical control flow of the program.

14. One or more hardware storage devices as recited in claim 13, wherein said interface provides a debugging environment for said program.

15. One or more hardware storage devices as recited in claim 13, wherein a task scheduler executing on the one or more computing devices builds the virtual call stack.

16. One or more hardware storage devices as recited in claim 13, further comprising, subsequent to executing the at least one other of the plurality of functions that appears prior to the one of said plurality of functions in the logical control flow of the program, indicating at the interface that the breakpoint was reached.

17. One or more hardware storage devices as recited in claim 13, wherein said executing the object code of the program occurs on at least two of the computing devices.

18. One or more hardware storage devices as recited in claim 13, wherein said program is a distributed program executing in multiple threads across at least two of the computing devices.

19. One or more hardware storage devices as recited in claim 13, wherein the multiple instructions further cause the one or more processors to:

compile the source code of said program into the object code, which object code is capable of executing on the one or more computing devices.

20. One or more hardware storage devices as recited in claim 13, wherein executing the at least one other of the plurality of functions that appears prior to the one of said plurality of functions in the logical control flow of the program comprises at least one of: stepping-in; stepping-out; or stepping-over.

* * * * *